US008826340B2

(12) United States Patent
Ciciora et al.

(10) Patent No.: US 8,826,340 B2
(45) Date of Patent: Sep. 2, 2014

(54) METHOD FOR MORE EFFICIENT COLLECTING OF INFORMATION

(71) Applicant: Symbol Shifters, LLC, Prescott Valley, AZ (US)

(72) Inventors: Walter Stanley Ciciora, Southport, CT (US); Ted Elliott Hartson, Scottsdale, AZ (US); Elijah Ethan Brown, Prescott Valley, AZ (US)

(73) Assignee: Symbol Shifters, LLC, Prescott Valley, AZ (US)

( * ) Notice: Subject to any disclaimer, the term of this patent is extended or adjusted under 35 U.S.C. 154(b) by 0 days.

(21) Appl. No.: 13/650,425

(22) Filed: Oct. 12, 2012

(65) Prior Publication Data

US 2013/0139195 A1   May 30, 2013

Related U.S. Application Data

(63) Continuation of application No. 13/555,757, filed on Jul. 23, 2012.

(60) Provisional application No. 61/627,619, filed on Oct. 14, 2011, provisional application No. 61/690,097, filed on Jun. 19, 2012, provisional application No. 61/690,104, filed on Jun. 19, 2012.

(51) Int. Cl.

| | |
|---|---|
| *H04H 60/56* | (2008.01) |
| *H04H 60/32* | (2008.01) |
| *G06F 3/00* | (2006.01) |
| *G06F 13/00* | (2006.01) |
| *H04N 5/445* | (2011.01) |
| *H04N 7/173* | (2011.01) |
| *H04N 1/32* | (2006.01) |
| *H04N 21/44* | (2011.01) |
| *H04N 21/462* | (2011.01) |
| *H04H 60/33* | (2008.01) |
| *H04H 60/46* | (2008.01) |
| *H04H 60/59* | (2008.01) |
| *H04H 60/31* | (2008.01) |

(52) U.S. Cl.
CPC ...... *H04N 1/32149* (2013.01); *H04N 21/44008* (2013.01); *H04N 21/4622* (2013.01); *H04N 7/17318* (2013.01); *H04H 60/31* (2013.01); *H04H 60/33* (2013.01); *H04H 60/46* (2013.01); *H04H 60/56* (2013.01); *H04H 60/59* (2013.01)
USPC ............... 725/51; 725/109; 725/12; 725/19; 725/20

(58) Field of Classification Search
None
See application file for complete search history.

(56) References Cited

U.S. PATENT DOCUMENTS 6,384,744 B1 *  5/2002  Philyaw et al. ................ 341/50
6,543,052 B1 *  4/2003  Ogasawara .................... 725/60

(Continued)

OTHER PUBLICATIONS http://zbar.sourceforge.net/index.html, Admitted Prior Art.

(Continued)

*Primary Examiner* — Brian T Pendleton
*Assistant Examiner* — Jonathan V Lewis
(74) *Attorney, Agent, or Firm* — Kilpatrick Townsend & Stockton LLP

(57) ABSTRACT

Apparatus and processes for locating and processing QR codes or other Scannable Icons (SI's) in video or television signals. A number of client elements (which may correspond to users) may be in communication of one or more control elements; the client elements may be found in user set top boxes, digital video recorders or other equipment employed to receive video or television signals. The control elements may be found in software in server platforms or such user equipment. The client elements may locate and decode SI's according to various areas of interest of users. The control elements may control which client elements monitor various video or television signals; receive information related to decoded SI's; and report information to client elements so that (among other things) users can be aware of SI's in far more video or television signals than their own client elements are able to monitor.

41 Claims, 13 Drawing Sheets

(56) References Cited

U.S. PATENT DOCUMENTS

| | | | |
|---|---|---|---|
| 7,213,254 B2 * | 5/2007 | Koplar et al. | 725/23 |
| 7,305,691 B2 | 12/2007 | Cristofalo | |
| 7,590,941 B2 * | 9/2009 | Wee et al. | 715/753 |
| 7,623,823 B2 * | 11/2009 | Zito et al. | 455/2.01 |
| 7,757,248 B2 | 7/2010 | Harkness et al. | |
| 7,992,175 B2 | 8/2011 | Kahn et al. | |
| 8,055,901 B2 * | 11/2011 | Behm et al. | 713/176 |
| 8,102,544 B2 * | 1/2012 | Yoshimura et al. | 358/1.11 |
| 8,301,458 B2 * | 10/2012 | Amato et al. | 705/1.1 |
| 8,326,212 B2 * | 12/2012 | Ramaswamy et al. | 455/2.01 |
| 8,386,339 B2 | 2/2013 | Minnick et al. | |
| 8,430,302 B2 * | 4/2013 | Minnick et al. | 235/375 |
| 8,433,800 B2 * | 4/2013 | Chor | 709/225 |
| 8,443,407 B2 | 5/2013 | Gaede et al. | |
| 8,484,087 B2 * | 7/2013 | Harper et al. | 705/26.7 |
| 8,496,177 B2 * | 7/2013 | Sevier et al. | 235/462.15 |
| 8,528,021 B2 * | 9/2013 | Kuang | 725/51 |
| 8,621,548 B2 * | 12/2013 | Friedman | 725/141 |
| 2002/0010941 A1 * | 1/2002 | Johnson | 725/108 |
| 2002/0023263 A1 | 2/2002 | Ahn et al. | |
| 2002/0056096 A1 * | 5/2002 | Mori et al. | 725/38 |
| 2003/0115612 A1 | 6/2003 | Mao et al. | |
| 2005/0012859 A1 * | 1/2005 | Adolph et al. | 348/473 |
| 2005/0071868 A1 * | 3/2005 | Yoshida | 725/39 |
| 2005/0198661 A1 * | 9/2005 | Collins et al. | 725/19 |
| 2005/0198672 A1 | 9/2005 | Ikeda | |
| 2006/0036585 A1 * | 2/2006 | King et al. | 707/3 |
| 2006/0265731 A1 | 11/2006 | Matsuda | |
| 2007/0006275 A1 * | 1/2007 | Wright et al. | 725/133 |
| 2007/0016936 A1 | 1/2007 | Okada et al. | |
| 2009/0217335 A1 * | 8/2009 | Wong et al. | 725/114 |
| 2010/0325657 A1 | 12/2010 | Sellers et al. | |
| 2012/0067943 A1 * | 3/2012 | Saunders et al. | 235/375 |
| 2012/0137318 A1 * | 5/2012 | Kilaru et al. | 725/14 |
| 2012/0272279 A1 | 10/2012 | Lim et al. | |
| 2012/0311623 A1 * | 12/2012 | Davis et al. | 725/18 |
| 2013/0024882 A1 | 1/2013 | Lee et al. | |
| 2013/0036434 A1 * | 2/2013 | Shkedi et al. | 725/14 |
| 2013/0104180 A1 * | 4/2013 | Knightbridge | 725/116 |

OTHER PUBLICATIONS http://zbar.sourceforge.net/about.html, Admitted Prior Art.

Non-Final Office Action, U.S. Appl. No. 13/555,757, mailed Jul. 12, 2013.

Notice of Allowance, U.S. Appl. No. 13/555,757, mailed Oct. 28, 2013.

* cited by examiner

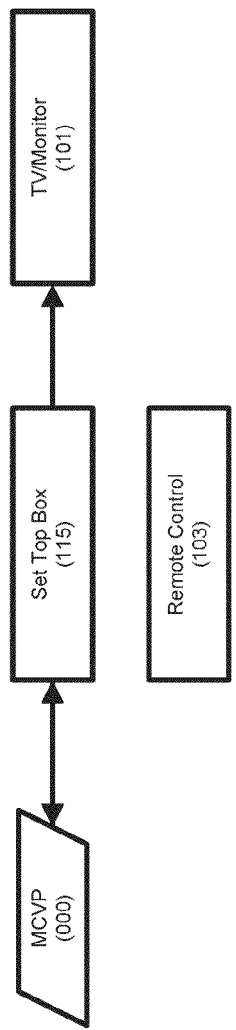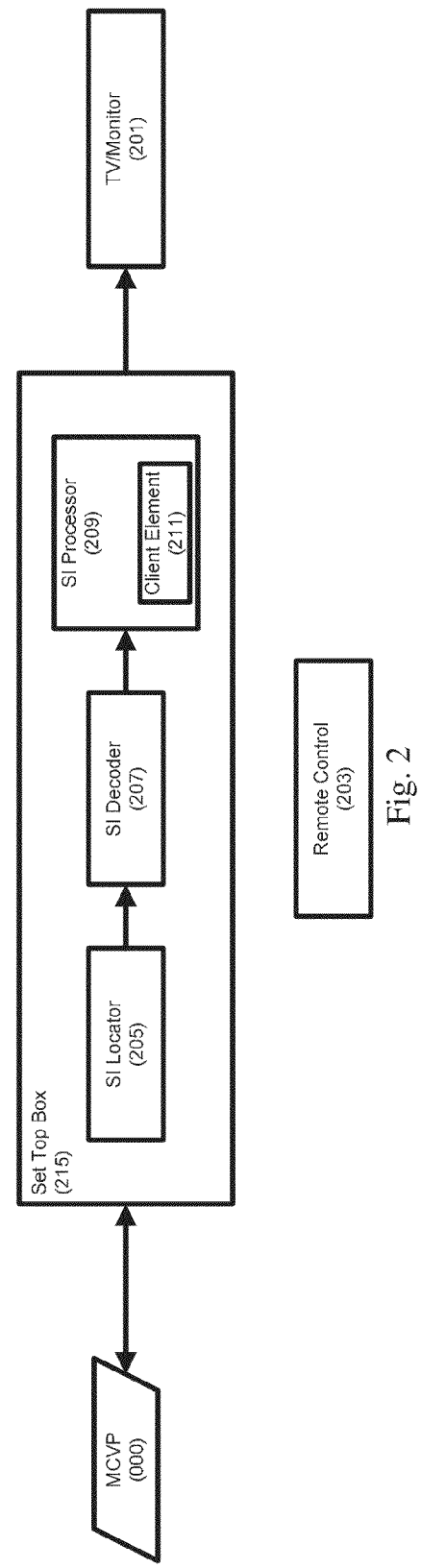

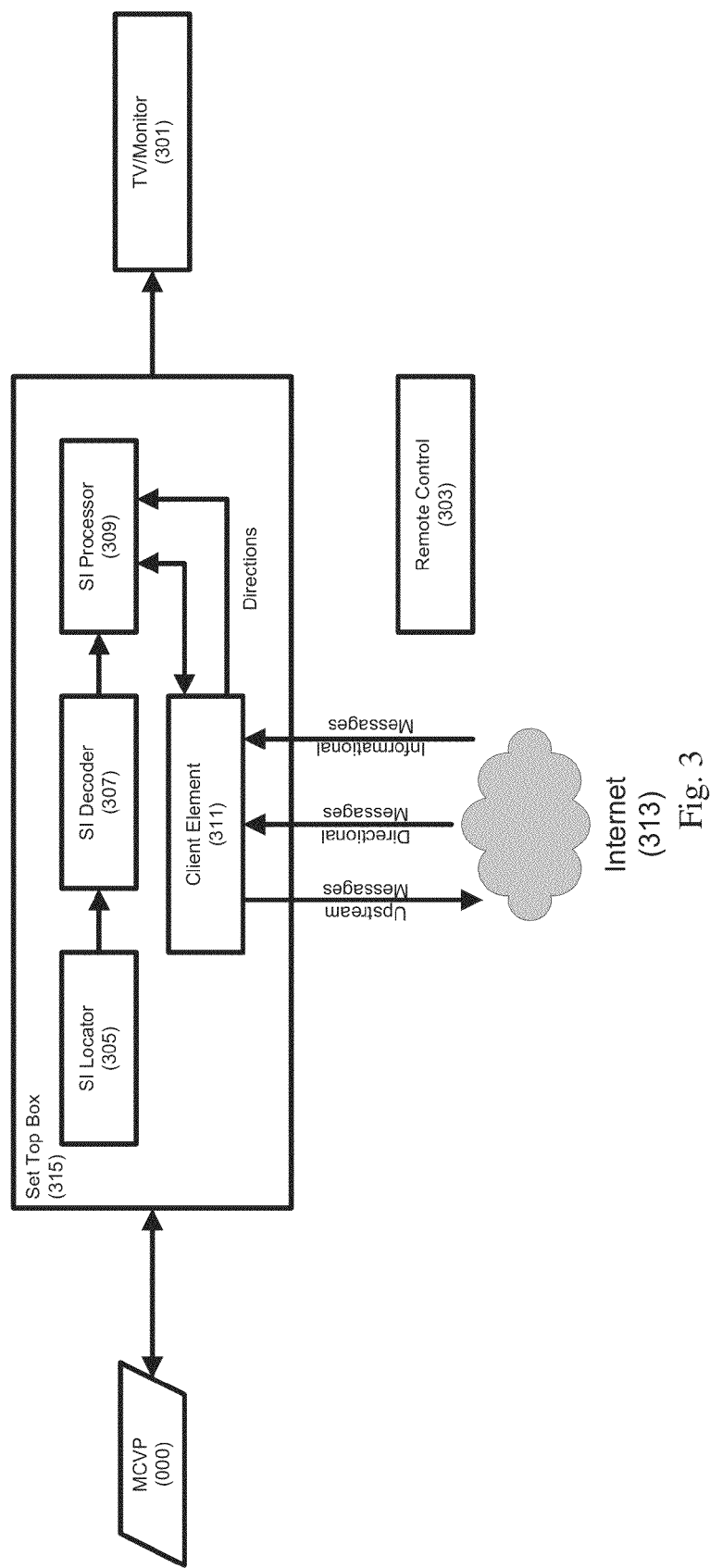

METHOD FOR MORE EFFICIENT COLLECTING OF INFORMATION

This application claims priority to the following three provisional U.S. patent applications: (1) provisional patent application titled "Method for More Efficient Collecting of Information" filed Oct. 14, 2011, U.S. Ser. No. 61/627,619; (2) provisional patent application titled "Method for More Efficient Collecting of Information" filed Jun. 19, 2012, U.S. Ser. No. 61/690,097; and (3) provisional patent application titled "System for Scannable Icon Detection and Management" filed Jun. 19, 2012, U.S. Ser. No. 61/690,104. This application is also a continuation application of U.S. utility patent application titled "System for Scannable Icon Detection and Management" filed Jul. 23, 2012, U.S. Ser. No. 13/555,757. These four documents are incorporated herein by this reference, and priority to these four documents is claimed herein.

FIELD OF THE INVENTION

The invention relates to situations where groups of people have similar or common interests but limited time and limited facilities for finding and capturing information of common interest and need a method of assisting one another for the common good. One specific example involves the finding and decoding of QR codes, bar codes, Scannable Icons ("SI"), or other graphical codes in video images which in many cases results in storing and/or cataloging coupons or information about products or other information. In this document, the term "SI" shall mean any or all of QR codes, bar codes or other graphical codes in video images. That certain pending utility patent application titled "System for Scannable Icon Detection and Management" filed Jul. 23, 2012, U.S. Ser. No. 13/555,757, which is incorporated herein by this reference, discloses certain systems and methods for capturing, processing and using such codes and, among other things, describes Scannable Icons.

BACKGROUND

Receivers of video and other information tune to or accept one signal at a time. In some cases, a receiver, usually with recording capability, might have several tuners or the ability to receive and decode several signals at the same time, one signal optionally for viewing, another signal possibly for a "Picture-In-Picture", PIP, feature, with some or all of such signals for optionally recording. But even in these cases the number of simultaneous programs and the number of signals simultaneously available on cable, satellite, broadcast, and other media is huge in comparison. Conventionally, users do not attempt to acquire QR code information using a conventional optical path such as a smartphone camera when such programming is presented to them such as on a monitor. Among other factors making such optical path QR code acquisition impracticable, by the time the user is aware of the QR code and is able to actuate her smartphone for acquisition, the QR code is gone from the screen. Additionally, even if it were practicable for a user to do such conventional optical path QR acquisition, the user is typically supplied with only one or at most several screen presentations for only one channel or a handful of programming channels at a time, thus making it likely that the user may miss some relevant QR codes in other programming channels. This is a major deficiency in the prior art. Not until there is a more organized and comprehensive way to acquire, store and process information from QR codes that are contained in programming channels does it become possible realistically to address how such information may be captured, processed and shared among various users according to, for example, their interests.

A further problem with the prior art is that Multi Channel Video Providers, MCVPs, are limited in their ability to attract significant numbers of viewers to advertisements because there are so many programs being offered at the same time and because there is so much competition for viewers. This limits the revenue they can generate from their advertisements. The term MCVP is intended to include any service or method that provides multiple programs by any technology.

SUMMARY

A goal of certain embodiments of the invention is to overcome the deficiency in the prior art that limits SI access to those in just one or in some cases, two video streams at a time. Certain embodiments of the invention create networks of elements, called client elements, which are coordinated by another element, called a control Element to overcome this deficiency. These elements can be embodied in set top boxes, adapters, television receivers, computers, laptops, iPads, iPods, video games, and other such devices. This network of client elements and a control element is organized to search out and capture and share SIs suitable to the area of interest of the members of the network. The term network can be defined as simply an interconnection of elements in a manner that enables the elements to communicate with each other, either directly element to element or indirectly through relaying communications thru paths that include other elements. Certain networks according to the invention consist of elements which share a common area of interest. A client element can participate in more than one network.

Devices of certain embodiments of the invention provide SI capture and processing in accordance with, for example, that certain pending utility patent application titled "System for Scannable Icon Detection and Management" filed Jul. 23, 2012, U.S. Ser. No. 13/555,757, which is incorporated herein by this reference. That document discloses certain systems and methods for capturing, processing and using such codes and, among other things, describes Scannable Icons. According to embodiments of the invention disclosed in this document, users can share information obtained from such systems and processes according to their various areas of interest, in order, for example, to ensure that SI information is obtained from more programming channels or otherwise to leverage the processing power of multiple such systems.

According to some embodiments of the invention, devices for capturing, processing and using SI include devices which can include at least one signal receiver, which can be, for example, a set top box (STB) or a digital video recorder (DVR). Such STB's and/or DVR's (or other receiving equipment) may include conventional STB, DVR or other receiving/video processing and storage functionality. Additionally, each such receiver can include functionality according to pending utility patent application titled "System for Scannable Icon Detection and Management" filed Jul. 23, 2012, U.S. Ser. No. 13/555,757. Each such equipment can constantly search for barcodes, graphical codes or other information in the signal it is tuned to and, if it has multiple tuners, the search proceeds in the other signals as well. When the device is in an "off state," it merely appears to be "off" to the user. Some appropriate portion of the electronics can be powered and the search can continue. This is done in normal practice so that the device can continue to receive control signals from the operator and can be polled to determine whether purchases have been made. Clearly, if power is removed and the circuits are without energy, this cannot proceed. This mode of operation can be considered a process of "going hunting" or "going fishing". As the receiver detects graphical codes or other information, it can catalog the time, channel (or other signal identification) and the size and location in the screen of any graphical codes. This allows the receiver to learn where best to look. This search can be managed with persistence similar to the viewing habits of the user. This may be considered analogous to identifying "favorite fishing holes". In this way, the receiver becomes more efficient at finding graphical codes or other information.

Some embodiments of the invention can implement expiration dates to flush information out of memory that becomes stale. This is especially important in cases where memory is more limited, such as in STBs that don't have hard drives.

According to some embodiments of the invention, such devices for capturing, processing and using SI can include functionality ("client element") for sharing such information with other users. Such client elements, which can correspond to users, may be connected to each other and/or otherwise connected via a cable network, the Internet, or otherwise. Their operation may be coordinated using functionality ("control element") that communicates with and helps manage each client element. control elements may be located in a user's equipment, at a central facility or as otherwise desired. Both client elements and control elements may be implemented wholly or partially in software in already-existing equipment of users or others.

In some embodiments, the memory in client elements can be implemented with a tagging system to indicate which items have been reviewed and considered of interest to the viewer. This can be either a binary indication of interest or a multi-level indication of priority of interest. Either method will help focus future searches. Even information that is considered to be of little or no interest is important because that also can help focus future searches away from such information.

According to some embodiments, groups of users with common interest can share information captured by their client elements, according to the area or areas of their common interest ("Areas of Interest" or "AOIs"). The Areas of Interest could be based on topic, geographic areas (by ZIP code, telephone area code, location on a cable television node), members of organizations (churches, lodges, clubs, etc.), amateur radio clubs, graduates from the same college department (even the same year), or other subjects of common interest. Members of these groups can belong to multiple groups. The client elements of such members can share information with one another, preferably as managed by the control element. This arrangement, among other things, ameliorates or even solves the "one tuner at a time" problem. Statistically, the equipment and client elements of group members cover the program streams or channels that would be of common interest. As time proceeds, the collection of users can "learn" where to look and where to find items of common interest.

According to some embodiments, third parties such as advertisers may take advantage of these groups and feed into them information that matches the AOI of the group. Advertisers may be invited into a group if the advertisement matches the AOI or may be invited out of the group if the advertisements clash with the AOI.

In some embodiments, third party organizations having common interests or AOI's that correspond to a group's AOI can feed information into these groups, again being either invited in or invited out. These third party organizations can directly provide information to the groups of receiving devices or alert the devices of an advertisement beginning on a particular channel or other signal stream sufficiently early so that the graphical code or other information can be captured. For example, a parent's organization (perhaps organized by a church or similar organization) may suggest products and programs suitable (whitelisted) or unsuitable (blacklisted) for children, perhaps by age group. Similarly, automobile clubs may direct and seed receivers of members to advantageously find information of interest. A wide variety of interest groups can, in some embodiments, form organizations that assist those of common interest in finding and capturing information of interest.

Conventional technology includes systems that can conduct certain types of pattern recognition of commercials for the purpose of ensuring they "played," and for making reports to the advertisers that such airing actually occurred. In such systems, large banks of tuners and processors monitor all channels and catalog the playing of the commercials. This pattern recognition focuses on patterns of light in prescribed areas on the screen. Such systems can be utilized in certain embodiments of the invention to generate alerts to receivers that an advertisement with a graphical code has begun on a particular channel. That alert can be in sufficient time to ensure detection of the graphical code which plays a bit later in the commercial. Such systems are described in U.S. Pat. No. 5,485,518 issued Jan. 16, 1996 to Hunter et al. titled "Electronic Media Program and Choice," which patent is incorporated by this reference, at column 2, beginning at line 5.

Other organizations can gather and provide feedback to advertisers, either for a fee or because they have been supported by an organization of advertisers. This feedback would encourage practices that are effective and discourage those which are not. One example of the benefit of such activity is that the size and location of graphical codes would tend to become standardized since those would be more likely to be captured. Such feedback can be generated in client elements and/or control elements according to certain embodiments of the invention.

MCVP operators are plagued by massive dilution of advertisement utilization because of the huge number of programs offered and by the competition between providers. SI codes involve Internet access of additional information which can be tracked to demonstrate efficacy and/or efficiency of advertising. Certain embodiments of the invention increase the number of viewings of SIs. More SIs are found by monitoring multiple video streams and more SIs are viewed by distributing the results of the searches to the members of the area of interest. This will be of significant value to MCVP operators who use SIs in a manner consistent with the present invention.

BRIEF DESCRIPTION

FIG. 1 is a schematic diagram that shows a prior art television and set top box.

FIG. 2 is a schematic diagram that shows a television and set top box with SI apparatus according to one embodiment of the invention.

FIG. 3 is a schematic diagram that shows another embodiment of the invention that includes the embodiment of FIG. 2.

DETAILED DESCRIPTION

Figure 4:
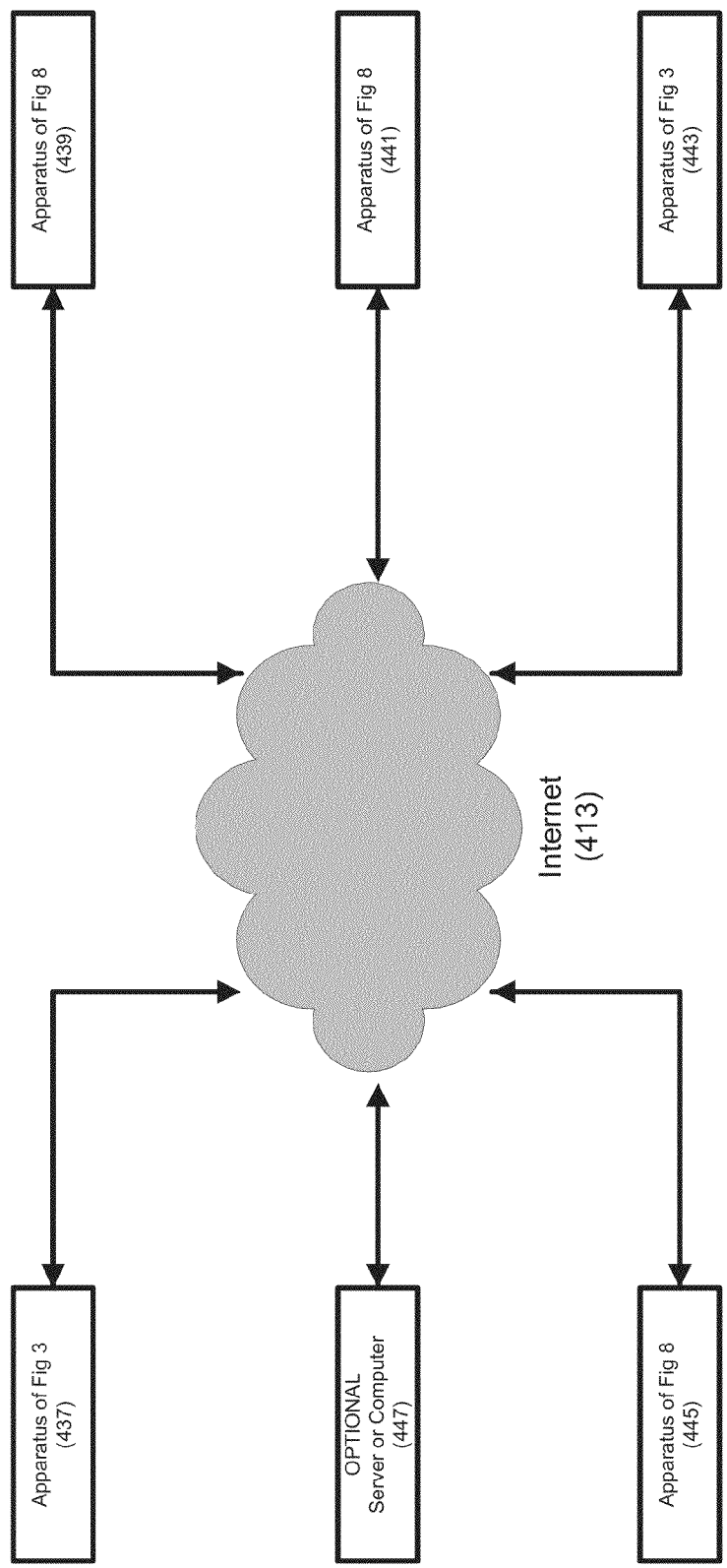
FIG. 4 is a schematic diagram that shows relationships of certain embodiments of the invention.

Some embodiments of the invention can take the form of an "application," or to use current terminology, an "app". This software can be made available for user downloading into receivers. The receivers can have hard drives of significant size or solid state versions with no moving parts. This facilitates relatively large collections of information and the ability to share that information with others as well as to share in the information gathered by others.

FIG. 1 shows a conventional set top box, remote control and television monitor. A Multi-Channel Video Provider, MCVP, supplies a signal, 000, consisting of multiple programs in either analog or digital or mixed form. In the limiting case, multiple programs may be delivered over just one transmission channel. The MCVP can be a cable operator, Direct Broadcast Satellite, DBS, operator, a telephone company providing video, a source of Internet Protocol video, an over-the-air broadcaster, or any other media providing programming. The term MCVP is intended to include any service or method that provides multiple programs by any technology. The Set Top Box, STB, 115 preferably includes a tuner and can include demodulation circuits as well as demultiplexer circuits and digital decompression circuits. A remote control, 103, provides commands from the viewer to operate the STB. The STB usually includes a microprocessor to respond to the remote control signals and provide commands to the various circuit elements in the STB. The microprocessor implements various STB features, such as Electronic Program Guides, EPGs, timers and clocks. The STB output baseband video signal is provided to TV/Monitor 101 or alternatively, modulated on an unused channel, such as channel 3 or channel 4. The circuits and functions provided by the STB could alternatively be built into the television receivers. Such systems as described in this paragraph are understood by one of ordinary skill in the art and are covered in many text books including "Modern Cable Television Technology" Second Edition, Morgan Kaufmann Series in Networking, by Walter Ciciora, James Farmer, David Large and Michael Adams, Dec. 8, 2001, ISBN-10: 1558608281.

A "video signal" is an analog or digital signal which contains information that is intended to ultimately result in a visual image, either stationary or moving. It may also include information which ultimately results in sound and other functions, but the ultimate visual image is the primary purpose. The signal may have any of a variety of forms which include but are not limited to electrical, radio frequency, optical, and mechanical vibrations. The signal may be stored in magnetic form, as electrical charges, or in any other form of storage. "Television" means vision at a distance. This is similar to "telephone" which means sound at a distance. As such, a "television signal" (which can also be analog or digital) and a "video signal" can in many circumstances be considered as essentially the same. "Programming" and "programs" are a sequence or stream of video signals or television signals intended to be of interest to viewers. This is not to be confused with computer programming and programs. The context makes the difference clear.

FIG. 2 shows an embodiment of the invention that includes the elements of FIG. 1, numbered with the same two least significant digits, plus additional SI elements. SI Locator, 205, finds SI embedded in video signals without the need of the optical path required by the prior SI art. SI Decoder, 207, decodes the data of the SI, and SI Processor, 209, stores that data and implements the other embodiments of that application. The elements 205, 207, and 209 can be implemented in hardware, software, or a combination of these two approaches. In particular, STBs with adequate memory and computational assets along with the ability to download software including additional applications, "apps," can have a software module(s) downloaded to implement these functions. The client element, 211, responds to a control element, not shown, located elsewhere as will be described subsequently.

FIG. 3 shows an embodiment of the invention that includes the elements of FIG. 2, numbered with the same two least significant digits, plus an Internet connection circuit is included in the client element, 311, which connects the STB, 315, to Internet 313.

An optional Internet connection feature has become common in STBs and television receivers for the reception of programming conveyed over the Internet. This programming has been called "over the top" and includes Netflix, Amazon, Hulu, YouTube, and other providers of programming. Some of that programming is advertiser supported and others are offered by subscription. The TiVo Premiere (http://www.tivo.com/products/tivo-premiere/index.html) is such a STB. It uses the Ethernet to connect to a subscriber's cable modem or other Internet connection. An optional Wi-Fi dongle is available and even an external telephone modem can be purchased.

Of course, the TiVo Premiere STB does not have elements 305, 307, and 309 for detecting, decoding, and processing SIs. Those elements instead are part of this embodiment of the invention. However, the TiVo Premiere does support downloading of software and could have elements 305, 307, and 309 installed by software download, as could other functionality according to certain embodiments of the invention as desired.

The SI Processor 309 can store SIs in a Library, can drop and add more appropriate SIs, or simply delete expired or inappropriate SIs. According to certain embodiments of the invention, an internet connection can be included for the purpose of acting upon the information in the SI.

Present day MCVPs provide hundreds of simultaneous programs. Additionally most viewers have choices between multiple competing MCVPs. Over a period of time, the number of programs and the potential for SIs seems countless. However, by connecting receivers into networks, a meaningful harvesting of SIs can be accomplished, far beyond what would be individually possible. As the number of networked receivers increases, the coverage of the available SIs increases dramatically. Other embodiments of the invention leverage such connections by connecting multiple users for cooperation for their common benefit.

FIG. 4 shows another embodiment of the invention that shows relationships of certain embodiments. Multiple subscribers are joined into groups, i.e. networks, and communicate with each other through the Internet 413. Apparatus such as found in FIG. 3, Elements 437 and 443, as well as apparatus such as found in FIG. 8, Elements 439, 441, and 445 as well as other implementations of the present invention can be interconnected. An optional server or computer, 447, may also be connected to the Internet, 413. The apparatus of FIG. 8 will be discussed below. The formation of groupings can be based on common areas of interest and a degree of shared control (the "control element"). Two types of software elements interact, with one of the software elements being directed and controlled by the other in the well-known client/server structure. Here the "control element" acts as the server directing the client elements as the client elements collect SIs and pass them on to the control element for further processing, storage and distribution. Since the client element and the control element can be software elements, the same device can include client element software for one or more areas of interest and control element server software for other areas of interest.

Figure 11:
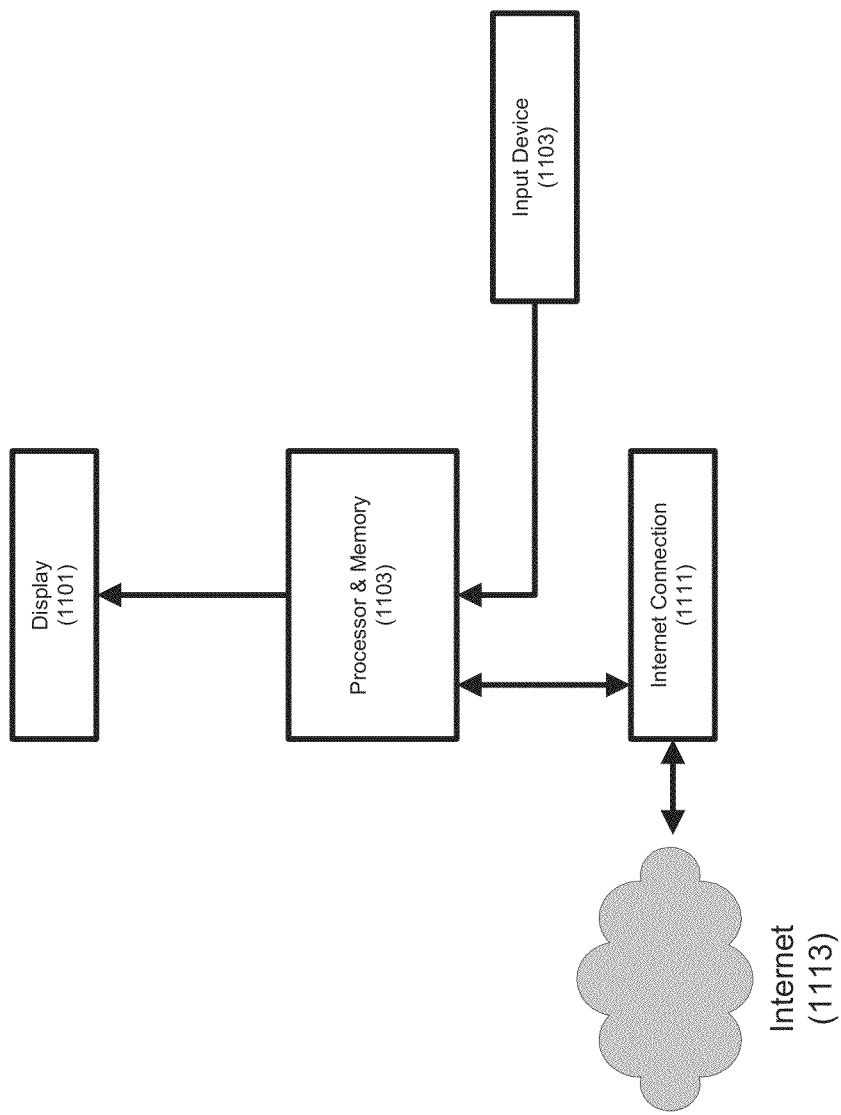
FIG. 11 is a functional block diagram of a control element according to one embodiment of the invention.

The control element is preferably embodied in software; FIG. 5, below, shows process flow for one implementation, and FIG. 11 is a functional block diagram of an implementation. The network can be created by individuals forming groupings (like clubs) with a person and his computer device or STB in control as the server or control element. The control element keeps an inventory of the information found by the members of the group and makes the inventory of information and the information itself available to the group. Alerts of new information found can be made to members of the group at each member's option via email, text, tweet, or other messaging or methods.

The control element is a software application which can run in the SI Processor, 309; it can also run on similar SI Processors in other embodiments, or on a separate Internet-connected computer or server. Referring to FIG. 4, the control element can be implemented on any one or more of the apparatus connected to the Internet 413 including the Optional Server or Computer 447. More than one control element can be used to implement more than one area of interest by users. The control element can take advantage of inexpensive, massive hard drives of multiple Tera byte capacities which internally or externally connect to STBs, Digital Video Recorders, DVRs, Television Receivers, Internet-connected computers, servers, Video Games, and the like.

Figure 5A:
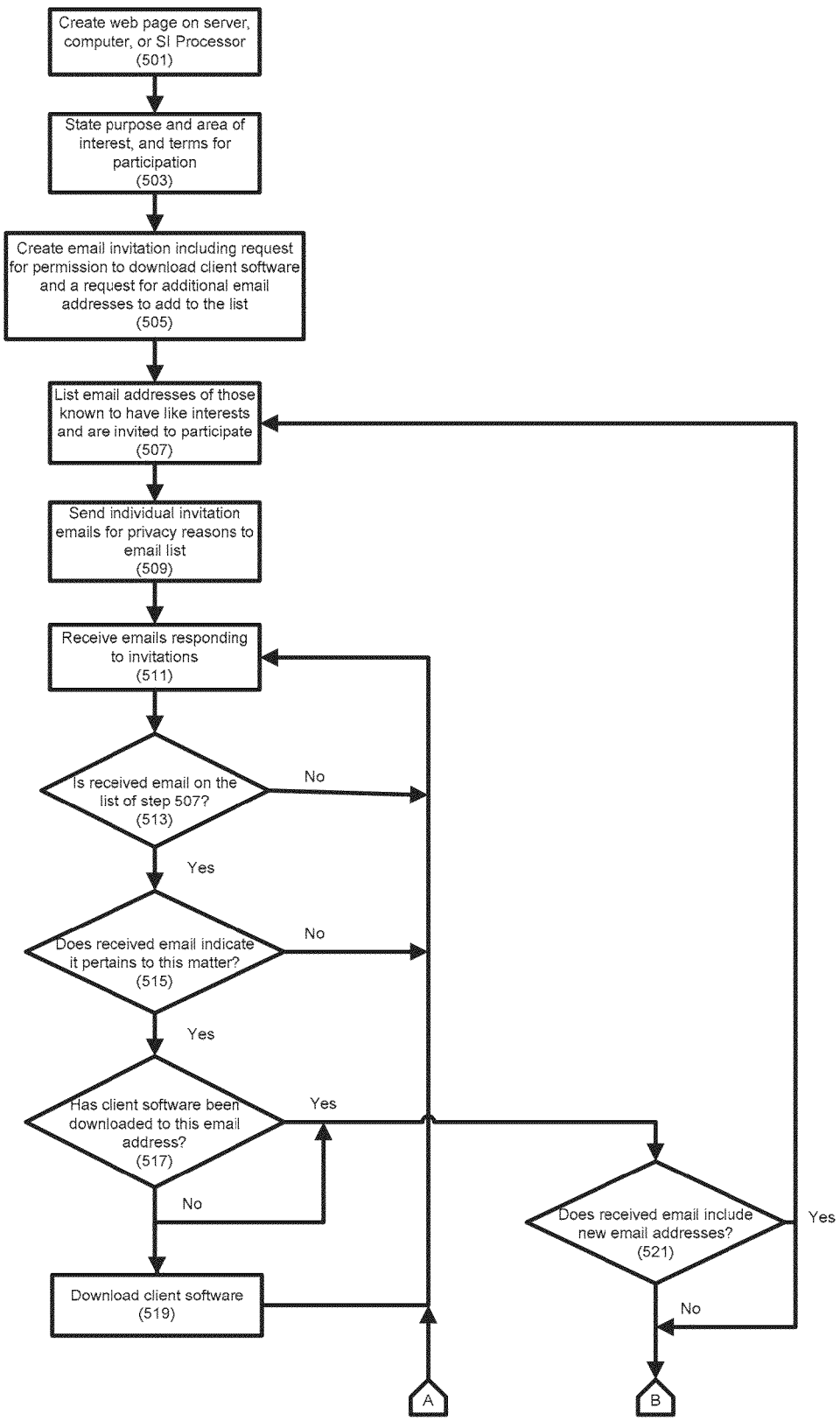
FIGS. 5A and 5B are flow diagrams that show processes carried out by a control element in certain embodiments of the invention.
Figure 5B:
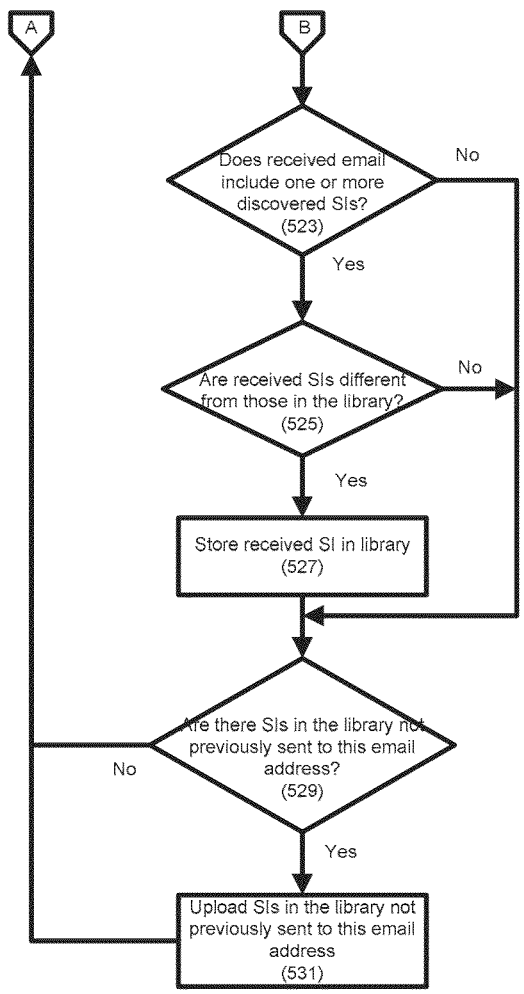

FIGS. 5a and 5b are flow diagrams for an embodiment of the control element operating on the server or any of the apparatus of FIG. 4. The flow proceeds as follows:

Step 501 Create web page on server, computer, or SI Processor

Step 503 State purpose and area of interest, and terms for participation

Step 505 Create email invitation including request for permission to download client software and a request for additional email addresses to add to the list Step 507 List email addresses of those known to have like interests and are invited to participate Step 509 Send invitation emails, optionally individually for privacy reasons, to email list Step 511 Receive emails including those responding to the invitations, but also others Step 513 Is received email address on the list of step 507?
If Yes, proceed to step 515, if No, reject the email and return to step 511

Step 515 Does received email include an indication it pertains to this matter?
If Yes, proceed to step 517, if No, return to step 511

Step 517 Has client software been downloaded to this email address?
If No, proceed to both step 519 and step 521, if Yes, proceed only to step 521

Step 519 Download client software, return to step 511

Step 521 Does received email include new email addresses for the Group Area of Interest?
If Yes, branch to both to step 507 and Step 523, if No, proceed to step 523

Step 523 Does received email include one or more discovered SIs?
If Yes, proceed to step 525, if No, proceed to step 529

Step 525 Are received SIs different from those in the Library?
If Yes, proceed to step 527, if No, proceed to step 529

Step 527 Store received SI in Library, proceed to Step 529

Step 529 Are there SIs in the Library not previously sent to this email address?
If Yes, proceed to step 531, if No, return to step 511

Step 531 Upload SIs in the Library not previously sent to this email address and return to Step 511

The client element is a software application which can run in the receiver processor 835 (shown in FIG. 8) and similar processors in other embodiments, or in other locations as desired. Referring to FIG. 4, the client element can be implemented on any one or more of the apparatus connected to the Internet 413 including those also running control element software. More than one client element can be used to implement more than one area of interest by users. The client element can take advantage of inexpensive, massive hard drives of multiple Terabyte capacities which internally or externally connect to STBs, Digital Video Recorders, DVRs, Television Receivers, Internet-connected computers, servers, Video Games, and the like. The process flow for one embodiment of a client element is found in the flow chart of FIG. 5c and an illustrative functional block diagram is found in FIG. 10.

Figure 5C:
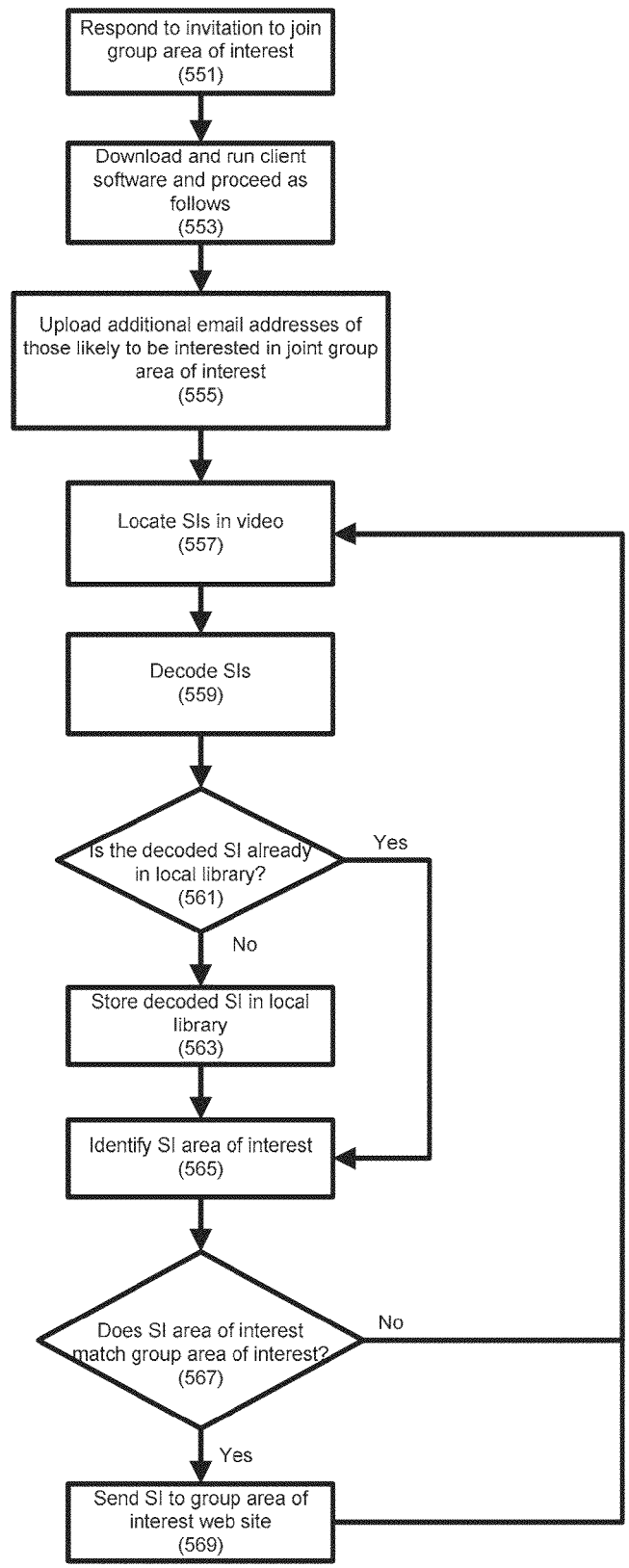
FIG. 5c is a flow diagram that shows processes carried out by a client element in certain embodiments of the invention.

FIG. 5c is the flow chart for processes carried out according to some embodiments of a client element that may be found, for example, in any apparatus of FIG. 4:

Step 551 Respond to invitation to join Group Area of Interest. The invitations can be initiated by an individual sending the invitations to those he or she knows are appropriate for the area of interest and asking them to invite others they know would be appropriate for the area of interest. In this way, the group with the area of interest grows rapidly. Of course, some individuals will receive multiple invitations.

Step 553 Download client software from the control element and run the software and proceed as follows:

Step 555 Upload additional email addresses of those likely to be interested in joint Group Area of Interest Step 557 Locate any SIs in video received by the apparatus from any sources per the disclosure in pending utility patent application titled "System for Scannable Icon Detection and Management" filed Jul. 23, 2012, U.S. Ser. No. 13/555,757 incorporated herein by reference. That application sometimes uses the term "detect" to describe processes by which data materially representing an SI or PGI is found in the complexity of a video data stream or video signal. Since "detect" and "locate" can be used interchangeably, this document sometimes uses the terms "detect" and "locate" interchangeably as each describes the process of finding the relevant SI's or PG's as selected by the Look Up Table. This process is in stark contrast to decoding the information contained within the found PGI(s). The decoding of scannable icons is well known and the subject of numerous propriety techniques. Quoting from said patent application:

There is also provided a system for managing information relating to a predetermined graphical image that includes a coded data sequence, the predetermined graphical image included in an analog or digital video signal, the data sequence generated by a source provider, the system included in a processing facility of a video provider, the system comprising:

a. A data stream processor configured to receive and process one or more analog or digital video signals;
b. A video decoder configured to decode at least one of the analog or digital video data signals in order to generate a digital video data stream;
c. A graphical image detector configured to receive a digital video data stream from the data stream processor or the video decoder, and to locate in the video data stream, data corresponding to the predetermined graphical image;
d. A lookup table configured to receive information relating to detection parameters for one or more different types of graphical images that include coded data sequences, and to provide information relating to detection parameters for the type of the predetermined graphical image to the graphical image detector.

Also

A SI is likely to appear for more than n seconds

The SI is likely to remain in a fixed location with x and y coordinates in the video.

That location is, for English speaking countries, likely to be in the lower portion of the screen and probably not centered (e.g. left or right)

QRs have a built-in precursor to aid recognition. These are in the form of 'boxes' of specified relative size and located at specific places within the QR image. SIs have a similar 'run in code'. A library (The icon lookup table) of these aids can be made a part of the search engine which finds the SIs.

One example of a recovery process would capture a number of MPEG I-frames (or similar images) and assemble them and look through them for the precursor 'box' using a form of auto correlation by building up an additive signature from the successive layers. Software which locates specified patterns in an image are well known in the art. For example, many still picture digital cameras and many camcorders come with "face recognition" features which aid in focusing the camera on the portion of the image of most interest. The SONY high definition camcorder model HDR-CX160 has a feature which even recognizes when the faces are smiling and automatically captures a photograph under those circumstances.

Once a QR code box candidate is found, rigorous search may be conducted in the neighborhood, plus/minus "one QR' size (determined as a ratio of QR to found box) to orient and establish recovery schemes which can include conventional schemes.

Helper signal options can include, but are not limited to: 1) a flag in a less visible area of the image such as the over-scan, 2) in analog signals, a message in the Vertical Blanking Interval (VBI) which designates that a SI is present with XY coordinates, 3) ancillary data in the MPEG data stream which locates the SI. The helper signals can be used to accelerate SI detection but are not essential to the process.

Step 559 Decode SIs per the disclosure in pending utility patent application titled "System for Scannable Icon Detection and Management" filed Jul. 23, 2012, U.S. Ser. No. 13/555,757 incorporated herein by reference. With respect to the decoder process, there are any numbers of conventional applications for optical recovery [e.g. ZXing, RedLaser, NeoReader, and Kaywa] which can be modified by a person understanding the steps existent in SI detection programs. These existing software applications assume the environment of a smartphone whose camera is directed by the user to the vicinity of the SI. Many are capable of multiple SI formats, both one and two dimensional. ZXing in particular has its source code published and in the public domain. A person of ordinary skill will understand that while the human intervention of moving the camera around to center the portion of the bit stream which contains the relevant SI in a 'detection box' significantly narrows down the detector's search area, the actual detection of patterns (which must precede the actual decoding of the SI) will follow a process similar to that described in the Element 106 and in FIG. 12. It should also be appreciated that none of the above-named applications are capable of grabbing more than one SI at once, though applications according to certain embodiments of the invention may be so capable. Quoting from said patent application:

a. A graphical image decoder configured to receive information from the graphical image detector and to decode the predetermined graphical image in order to extract at least some of the data in the coded data sequence included in the predetermined graphical image;
b. A first library configured to receive from the graphical image decoder decoded information from the predetermined graphical image and ancillary information relating to the predetermined graphical image, the ancillary information relevant to the analog or digital video data signal that includes the predetermined graphical image;

Step 561 Is the decoded SI already in local Library?
If No, proceed to Step 563, if Yes, proceed to Step 565
Step 563 Store decoded SI in local Library
Step 565 Identify SI Area of interest
Step 567 Does SI Area of Interest match Group Area of Interest?
If Yes, proceed to Step 569, if No, proceed to Step 557 and continue locating and decoding SIs in received video. Optionally (not shown in FIG. 5*b*), delete SI from local library or retain it for other purposes
Step 569 Send SI to Group Area of Interest web site and/or Group Area of Interest controller
Step 571 Proceed to Step 557

The client element selects the SIs pertaining to the area of interest. This can be accomplished in several ways. The crudest way is by a self-selecting process. Those invited to join the area of interest group will have similar interests and watch more programming pertaining to that area of interest than the average viewer. Thus more of the SIs captured by the client will pertain to the area of interest. However, this will result in a significant portion of SIs that are not in the area of interest. This process can be improved by noting which SIs are acted upon by the member of the group, i.e. which ones the viewer uses to access more information. Still further improvement can be implemented by a "thumbs up/thumbs down" or similar voting scheme acted upon by the viewer. An additional method is to have a few key words pertaining to the area of interest. Those key words are communicated from the controller to the client. The client element can use key word search techniques on the information in the SI or in the information retrieved by using the SI. These techniques can be used to select SIs for adding to the library of SIs. As these techniques gain greater usage, creators of SIs will actively include appropriate key words to increase the rate of capture.

Because each client element and each control element are connected to the Internet, they each have an Internet address. A wide variety of Internet communication protocols are known in the art and can be implemented for communication. These Internet messages may be sent individually in either direction between client and controller or some messages may be sent in a one-to-many form; i.e. broadcast.

Figure 6:
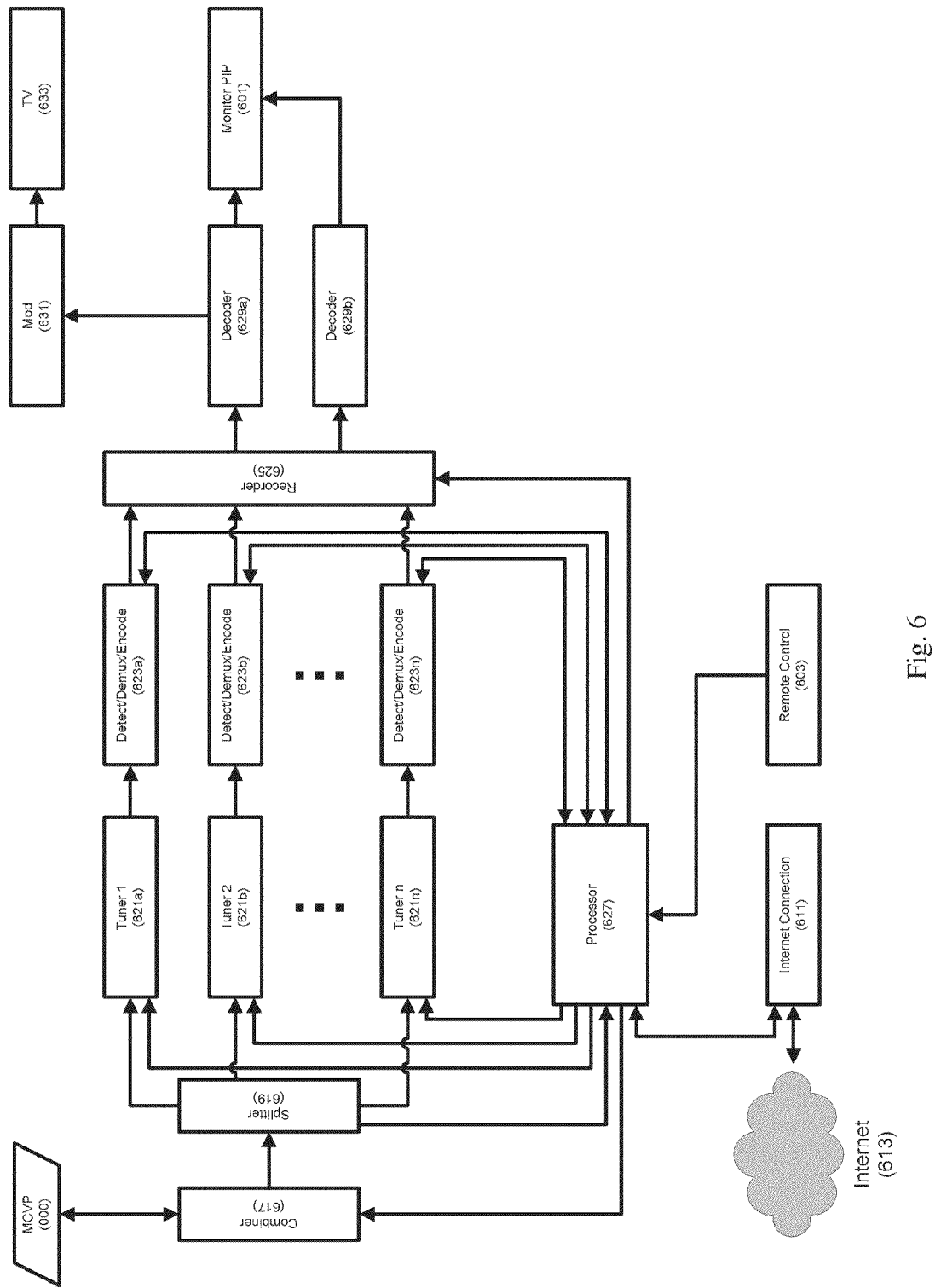
FIG. 6 is a schematic that shows a conventional digital video recorder.

FIG. 6 is a schematic diagram that shows a conventional digital video recorder (DVR) of the prior art. FIG. 6 includes many of the elements of FIG. 3, numbered with the same two least significant digits, plus other elements found in conventional digital video recorders. The digital video recorder can be considered in some ways as a digital equivalent of a video cassette recorder, or VCR, with computer-like hard disks used for storage instead of video tape. Programming is stored in digital form. Significant improved features are included.

Signals are provided by a MCVP 000, and are introduced to a combiner, 617, which enables upstream communication from the processor 627 of the DVR. Splitter 619 divides the MCVP signal and delivers the signal to each of multiple tuners, 521{a . . . n} and also to processor 627. The tuners select one channel's portion of the frequency spectrum and presents it to the detector/demultiplexer/encoder 623{1 . . . n}. The signal is then demodulated and thereby converted to baseband frequencies; i.e. from zero frequency to the upper limit of the signal's frequencies. The signal provided by the MCVP may be analog or digital or a mixture of some of each. Digital signal streams are demultiplexed in element 623 to select only one program for delivery to the recorder, 625. Analog signals must be converted to digital with the encoder function of 623 before they can be recorded by recorder 625. Recorder 625 is typically a very large capacity hard drive. However, as semiconductor memory continues to decline in price, the day may come when the mechanical hard drive is replaced with circuits having no moving parts. Most of the elements of FIG. 6 come under the control of processor 627 which also responds to the user's remote control, 603, signals from splitter 619, and signals which may come from the Internet, 613, via the internet connection 611 or from the MCVP. Processor 627 may communicate with MCVP, 000, via the combiner 617 and with the Internet 613 via Internet connection 611. Processor 627 includes circuits for receiving and demodulating signals as well as circuits for modulating and transmitting signals via MCVP 000 and/or the Internet 613. A wide variety of signaling methods are well known in the art.

When the viewer wishes to watch a program, the signal is read from the recorder 625 and converted by decoder 629 {a, b} to a form suitable for display on a monitor 601. Alternatively, the signal may go thru a modulator, 631, to a television receiver 633. Many television receivers also have monitor-like signal input ports. The DVR usually has at least two tuners and associated circuitry to allow the user to watch one program while recording another program. Usually, the watched program is also simultaneously recorded so that the viewer can "rewind" back to earlier parts of the program or pause it to attend to some distraction. Some monitors 601 and TV receivers 633 may optionally have a picture-in-picture feature which would best be used with a separate signal source. As integrated circuit tuners have become available, multiple tuner DVRs have become common. This is particularly cost effective if the MCVP signal is digital. In that case, it is suitable for digital recording without the need to convert from analog signals to digital.

The Internet connection 611 to the Internet 613 is commonly used to provide video signals via Internet Protocol as previously discussed with reference to FIG. 3.

The details of operation of the device of FIG. 6 are well understood by one of ordinary skill in the art.

Figure 7:
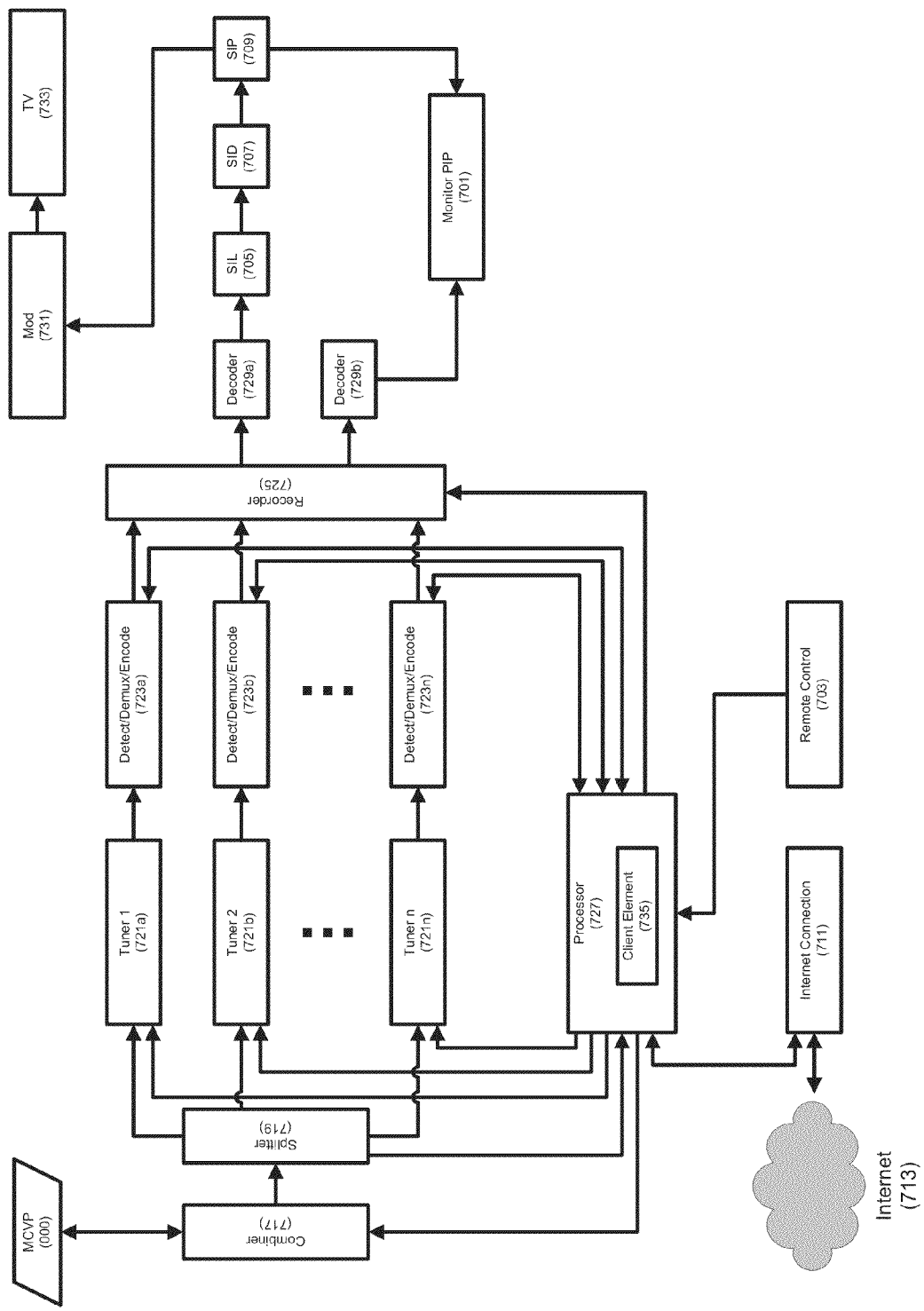
FIG. 7 is a schematic diagram that shows a digital video recorder with SI apparatus according to another embodiment of the invention.

FIG. 7 is a schematic diagram of an embodiment of the invention that includes all of the elements of FIG. 6, numbered with the same two least significant digits, plus SI elements according to an embodiment of the invention and as disclosed in pending utility patent application titled "System for Scannable Icon Detection and Management" filed Jul. 23, 2012, U.S. Ser. No. 13/555,757 incorporated herein by reference. SI locator 705 finds or locates SI embedded in video signals without the need of the optical path required by the prior SI art. SI decoder 707 decodes the data of the SI, and SI processor 709 stores and processes that data. The elements 705, 707, and 709 can be implemented in hardware, software, or a combination of these two approaches. In particular, STBs with adequate memory and computational assets along with the ability to download software including additional applications, "apps," can have a software module(s) downloaded to implement these functions.

Figure 8:
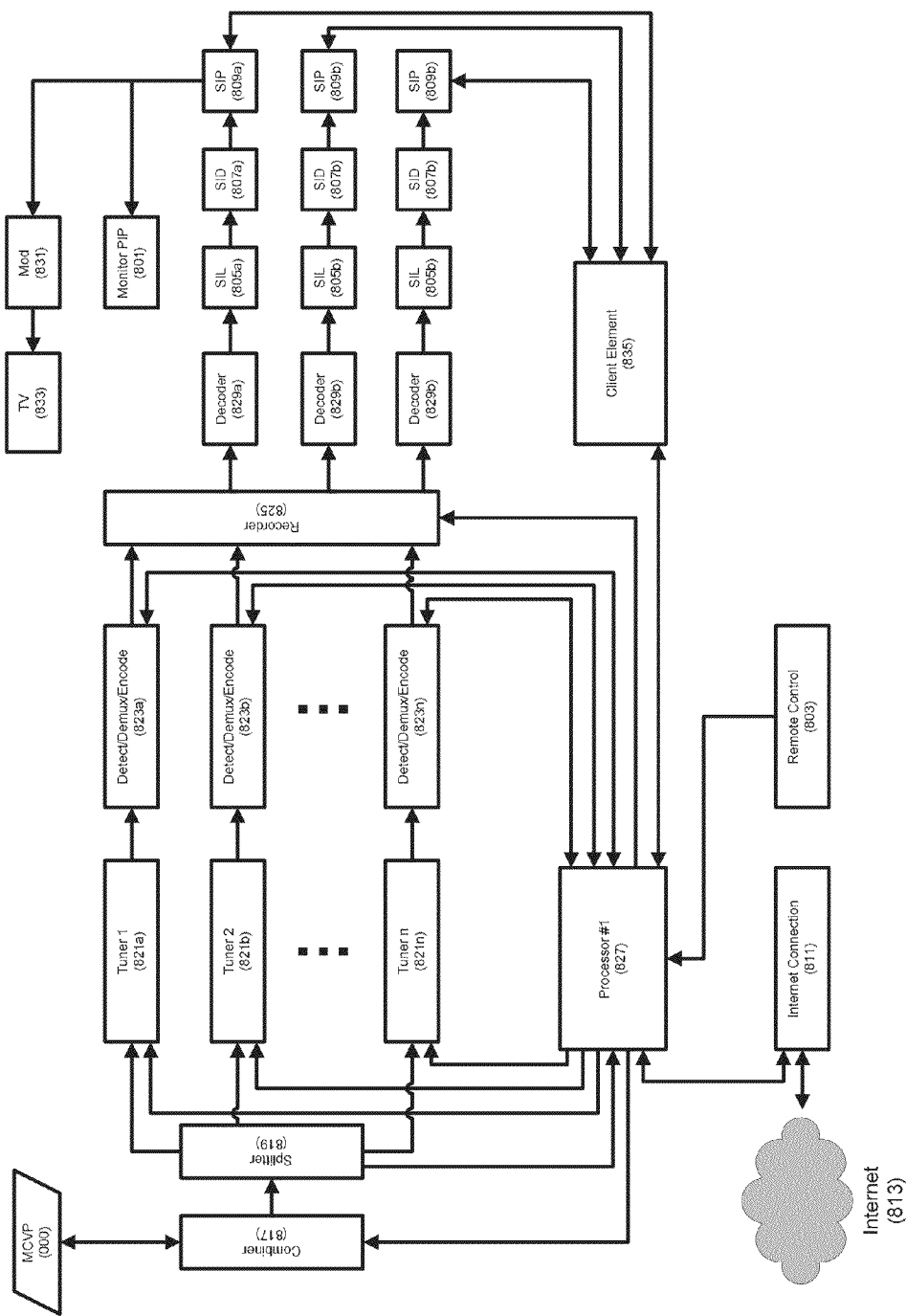
FIG. 8 is a schematic diagram that shows another embodiment of the invention that includes the embodiment of FIG. 7.

FIG. 8 includes all of the elements of FIG. 7, numbered with the same two least significant digits, plus multiple SI elements according to the invention, including additional SI locators, 805{b . . . n}, SI detectors, 807{b . . . n}, and SI processors, 809{b . . . n} and another processor #2, 835, labeled as the client element in FIG. 8. Processor #2 835 connects to each of the SI Processors 809 {a . . . n} and also to processor #1, 827. Because of this last connection, the SI processors 809 {a . . . n} have bi-directional access to the Internet, 813 thru the internet connection, 811 via processor #1, 827 and also come under the influence of remote control 803.

One of ordinary skill will appreciate that processor #1 827, processor #2 835, and the SI Processors 809{a . . . n} could be combined into one or more processors and do not have to remain separate. They are depicted here as separate for convenience of evolving the configuration in a more easily understood manner.

It is noted that all of these processors can have access to the recorder, 825. This is a huge memory which enables many alternative ways of signal processing. In particular, the SI Library can be stored on the recorder 825 by using a small proportion of its capacity. Additionally, as SIs are located or even as SIs are suspected, they can be temporarily stored on recorder 825 and then processed more carefully in non-real time.

One of ordinary skill will understand that the term STB can equally apply to hardware and/or software built into television receivers, DVRs, computers, iPads, games and other such devices. The control element will know which STBs are in use and which are in an "off" state through messages from the respective client elements. STBs in an "off" state can still be internally active and searching for information. But now the control element can issue instructions to the STBs as to which channels to monitor for information to collect. This minimizes STB duplication and ensures that the maximum number of channels is monitored. In the case of multiple tuner STBs, the tuners that are not used for other purposes, such as recording one signal while watching another, can also be under the control of the controlling element. In the case where more than one area of interest is in operation simultaneously, a given receiver will be controlled on a first-come-first-served basis. Alternatively, a priority can be implemented.

An illustrative example of a priority method is for the client elements to report to the control element which programs and/or channels are watched and how often by the members of the area of interest. This information can be sent anonymously, protecting the privacy of individual members of the area of interest group. This information can be complied and used to create a priority list of programs and/or channels to monitor for SIs.

Figure 9:
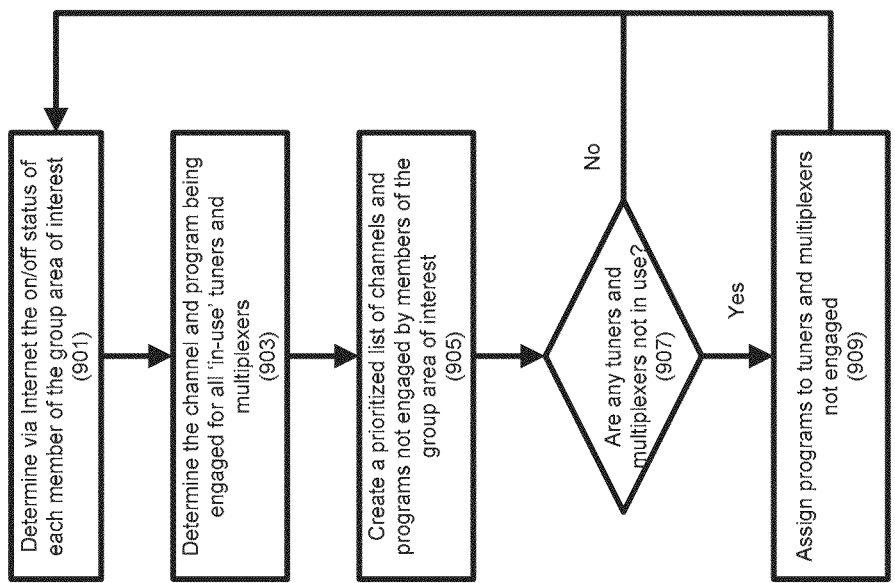
FIG. 9 is a flow diagram that shows processes carried out by certain embodiments of the invention.

FIG. 9 is a flow diagram that shows processes carried out by control element software according to one embodiment that is monitoring multiple signals. The flow in this diagram proceeds as follows:

Step 901 Determine via Internet the on/off status of each member of the Group Area of Interest Step 903 Determine the channel and program being engaged for all "in-use" tuners and multiplexers Step 905 Create a prioritized list of channels and programs not engaged by members of the Group Area of Interest Step 907 Are any tuners and multiplexers not in use?
If yes, proceed to Step 909, if no, proceed to Step 901

Step 909 Assign programs to tuners and multiplexers not engaged

Step 911 proceed to step 901

Figure 10:
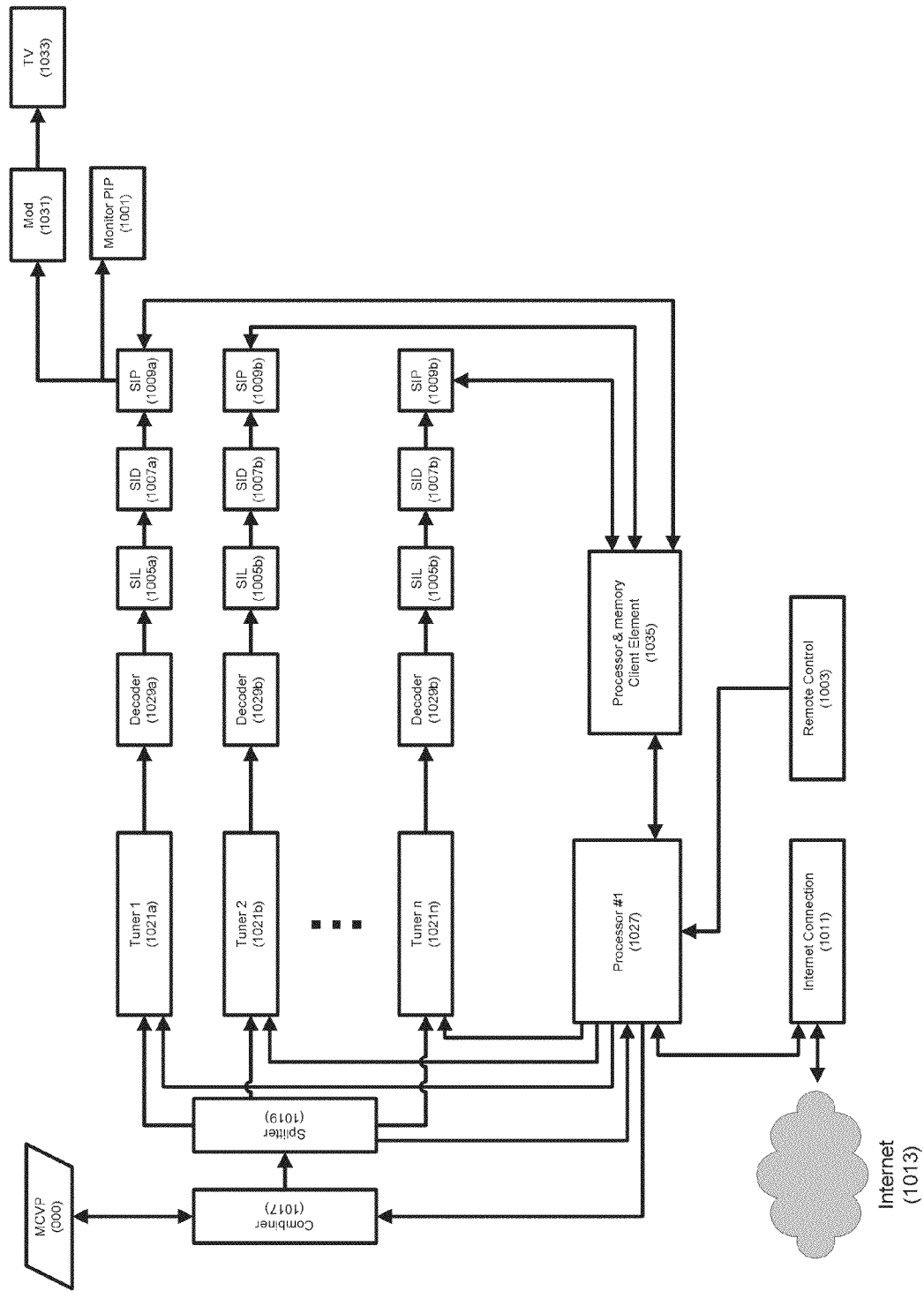
FIG. 10 is a functional block diagram of a client element according to one embodiment of the invention.

FIG. 10 is a functional block diagram of one embodiment of the client element, 1035. This illustrative implementation uses the DVR of FIG. 8 as an example. The client element itself is a microprocessor including a processor and memory for storage of its software and intermediate results, all well known by one of skill in the art. The client element preferably needs to have access to signals from other elements and be able to deliver signals to other elements. The client element has access to one or more SI processors, 1009 in order to collect SIs and store them in its memory. Additionally, the client element, 1035 has a direct or an indirect (through other elements) Internet Connection 1011 in order to be able to communicate with the control element located elsewhere to receive instructions and to communicate SIs it has found. The client element has direct or indirect access to the STB's, tuners and/or demultiplexers to know which signals are being used by the receiver and which might be available for searching other video signals per FIG. 9. This access also allows the client element to accumulate and report information on the frequency of use of programs and/or channels. This enables a priority to be assigned to the received signals.

FIG. 11 is a functional block diagram of one embodiment of a control element. The control element is preferably a server and can be implemented as a separate computer as shown as 447 in FIG. 4 or can be software implemented on any of the processors in the other devices of FIG. 4, including other devices that contain one or more client elements. The control element itself can be a microprocessor including a processor and memory for storage of its software and intermediate results, all well known by one of skill in the art. The control element has an Internet Connection, 1111, to the Internet, 1113. It also has an input device 1103 for inputting instructions and a display device 1101 to aid in that process. All of these elements may be implemented with an Internet-connected computer, iPad, iPod, laptop computer or similar device. Alternatively, television receivers and set top boxes for a variety of services include Internet access, displays, and input devices as well as the capability for down loading software, sometimes referred to as applications or "apps." Even modest cable set top boxes include on-screen displays and the ability to enter text, although this is sometimes implemented in a clumsy manner. Any of these devices can be used to implement the control element.

Figure 12:
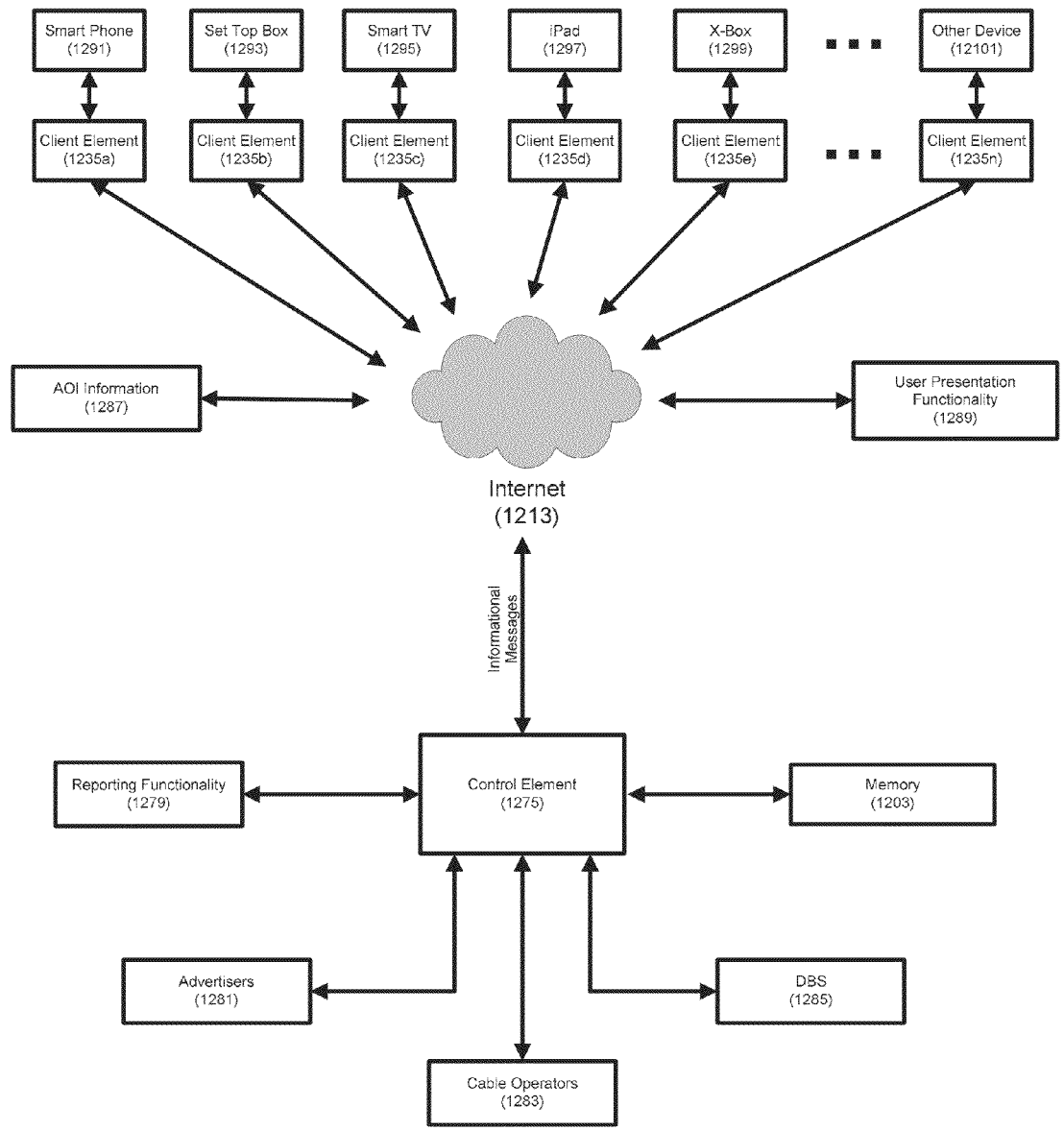
FIG. 12 is a schematic diagram showing a group of client elements in communication with a control element using the Internet

FIG. 12 illustrates the control element 1275 such as found in the example of FIG. 11 connected via the Internet to multiple client elements 1235*a* . . . 1235*n* such as found in the example of FIG. 10. The client elements 1235 can be imbedded in or connected to various devices such as Smartphones 1291, Set Top Boxes 1293, SmartTVs 1295, iPads 1297, X-Box games 1299 or other similar devices 12101. All of these devices have displays and input capabilities and microprocessors which include memory. The client elements can be implemented as software downloaded as an application or installed at the time of manufacture. In essence, the client elements can be programmed in this manner to, as one example, implement the process flow such as that shown in the flow diagrams included in this document. All of the client elements in this illustrative example belong to an area of interest grouping and are under the influence of control element 1275 via bi-directional messages sent thru the Internet 1213.

The control element 1275 can fundamentally be a processor which has memory 1277 associated with it. This processor can be implemented in a separate computer or server or can be implemented as part of the same devices that implement client elements. Those devices can optionally run both client element software and control element software at the same time. But preferably only one control element software operates in any one area of interest network. The control element can be implemented as software downloaded as an application or installed at the time of manufacture. In essence, the control element can be programmed in this manner to, as one example, implement the process flow disclosed in process flow diagrams included in this document. The control element 1275 may optionally be connected to a variety of third parties including but not limited to Advertisers 1281, Cable Operators 1283, DBS operators 1285 and others. The connections to third parties may be direct as shown in FIG. 12 or via the Internet. These third parties can input information into the control element to aid in the detection of SIs the third parties have an interest in ensuring notice. Advertisers are one example.

Area of Interest information 1287 is created by an individual or group of individuals and can propagate via invitations to join sent on the Internet 1213 to known individuals who share that interest. Those who accept the invitation have the client element software downloaded and are asked to invite others who might also be interested. In this manner, the group grows for example, as shown in the flow chart previously disclosed.

User Presentation Functionality enables the presentation to users of the results of the search for SIs relating to the area of interest. Each client element 1235*n* captures SIs in the area of interest and conveys them to the control element 1275 which assembles them in memory as a data base. The results can be presented to users by communication from the control element 1275 to each client element 1235*n*. This communication can be one to one individually to each client element 1235*n* or can be via a broadcast communication wherein the control element 1275 communicates simultaneously to all client elements 1235*n* in the area of interest. As previously disclosed in FIG. 4, the control element 1275 can be implemented in a server to which users have internet access. As an alternate embodiment, the several client elements 1235*n* may operate to the exclusive benefit of just one of the client elements 1235 in a master/slaves configuration. In that embodiment, the user presentation functionality is implemented in one client element. As a further alternative, the several client elements 1235n may operate to the exclusive benefit of a minority small number of client elements 1235 in a masters/slaves configuration. In that embodiment, the user presentation functionality is implemented in just the small group of master client elements.

An optional reporting functionality 1279 can be implemented to issue reports from the control element 1275 or the presentation functionality 1289 of various types of information of value to third parties via the Internet 1213 or by other communications technologies. A third party may find a report about a user's selection of SI information valuable. The report can optionally identify the user so that follow-up action can be implemented, for example, a sales call. Alternatively, statistics about the number of users who select a given SI may be anonymously accumulated to the value of, for example, an advertiser. Another report of interest is the confirmation that an SI has appeared in a video signal, verifying, for example, that a contractual obligation has been satisfied. A further report of interest consists of the context in which the SI is detected. For example, the time, the channel, or the physical location of the SI within the video can be of value to third parties such as, for example, designers of higher performance systems to detect SIs in video. In general, metadata is "data about data". That is, metadata includes but is not limited to details about the data format, timing, location, content, Internet addresses of the client elements and/or control element, identification of the users, area of interest of the group of client elements that detected the SI and other such information. This information can be of value to third parties and can be a source of revenue.

It is clear from the structure of FIG. 12 that the control element 1275 may be configured to broadcast messages to some or all of the client elements 1235n directing them to which video signals and areas of interest are to be monitored. Likewise, the same messages may be directed from the control element 1275 on a one-to-one bases to individual client elements 1235.

Areas of interest may be created by one or more users who wish to access more SIs pertaining to their interest area than can be accomplished just in their personal viewing time. By forming a network of other users, greater coverage of information can be accomplished since SIs are captured by the group in video not monitored by each individual user. Alternatively, a third party may supply an area of interest to the control element 1275 based on inferences about users' preferences supplied by companies that gather consumer information based on, for example, past purchases, membership in loyalty groups, inferences about household income based on zip code, and the like.

It may be important to protect privacy by not identifying channels and times of receivers in use and only identifying channels and times of found information when the receiver is "off" and in control of the controlling element. This would also apply to the multiple tuners that are not in use by the people in the location where the receiver is based. In that way, no information concerning what is being watched would be collected. Other methods of protecting privacy could be considered if it becomes necessary.

Of course, if it becomes desirable to collect information about what is being watched, viewers can be given the options to agree (opt-in), perhaps with some reward for their cooperation. This information can be collected anonymously.

Other embodiments can include implementation of applications or "apps" on portable devices such as cell phones or tablets. In those cases, geographic information from GPS or cell phone tower triangulation techniques can be factored into the decision process of which information to capture and which to ignore.

The multiple receivers and portable devices can be in contact with each other through the Internet, communication over cable, or any other appropriate method of communication.

The above described embodiments of the invention are intended to be illustrative only. Numerous alternative embodiments may be devised by those skilled in the art without departing from the scope of the following claims.

What is claimed is:

1. A network for processing and managing information related to graphical bar code data that generates graphical bar codes in video images, wherein the graphical bar codes are QR codes or one dimensional bar codes, and wherein the graphical bar codes can be acquired and decoded optically by a mobile device from a monitor that displays the graphical bar codes in the video images, the graphical bar code data located and decoded by receivers under control of at least one control element, the network including:

a receiver coupled to a monitor that displays video images to a subscriber, the receiver receiving input from the subscriber as to at least one area of interest as to which the subscriber desires to obtain information, and the receiver including:
one or more graphical bar code data locators, wherein each graphical bar code data locater is coupled to a video source and parses video signals from the video source to locate the graphical bar code data in the video signals;
one or more graphical bar code data decoders, each graphical bar code data decoder coupled to a graphical bar code data locater to decode the graphical bar code data;
wherein the locating and decoding of the graphical bar code data is accomplished without optically acquiring or decoding the graphical bar codes in video images generated by the graphical bar code data;
one or more graphical bar code data processors, each graphical bar code data processor coupled to a graphical bar code data locater; and
at least one client element coupled to at least one of the graphical bar code data processors, wherein the at least one client element:
connects via an external network to at least one control element to receive instructions from the at least one control element as to particular video signals and areas of interest that should be monitored by the receiver that includes the client element;
instructs one or more of the graphical bar code data processors to automatically monitor the particular video signals and areas of interest as to which the client element has received instructions from the control element, in order to locate and decode the graphical bar code data in the video signals; and
reports via an external network at least some information relating to the located and decoded graphical bar code data to the at least one control element.

2. A network according to claim 1 wherein the receiver is a set top box and the video signals are television signals.

3. A network according to claim 1 wherein the receiver is a set top box and the graphical bar code data are data that generate QR codes or bar codes that include a plurality of rectangles or squares.

4. A network according to claim 1 wherein the receiver is a set top box and at least some of the client elements are implemented in software.

5. A network according to claim 1 wherein the receiver is a set top box and monitors at least some video signals regardless of whether a monitor connected to the receiver is in an on or off state.

6. A network according to claim 1 wherein the receiver is connected to one or more devices for parsing multiple signals.

7. A network according to claim 1 wherein third parties have access to the at least one control element in order to input information.

8. A network according to claim 7 wherein the at least one control element reports to third parties information corresponding to the subscriber's selection of graphical bar codes supplied by the third parties.

9. A network according to claim 1 wherein techniques for identifying advertisements in video signals are employed to assist in location of graphical bar code data in the video signals.

10. A network according to claim 1 further comprising subscriber presentation functionality in communication with the at least one control element, and wherein the at least one control element reports to the subscriber presentation functionality, for the subscriber, information relating to graphical bar codes in the subscriber's area of interest for which graphical bar code data have been located and decoded in the subscriber's receiver.

11. A network according to claim 10 wherein the subscriber presentation functionality is implemented in a server to which the subscriber has internet access.

12. A network according to claim 10 wherein the subscriber presentation functionality is implemented in at least one client element.

13. A network according to claim 10 further comprising reporting functionality connected to the at least one control element or the subscriber presentation functionality, wherein the reporting functionality reports to a third party information about the subscriber's selection of graphical bar codes.

14. A network according to claim 10 further comprising reporting functionality connected to the at least one control element, wherein the reporting functionality reports to a third party that graphical bar code data have appeared in a video signal.

15. A network according to claim 1 wherein at least some information related to the graphical bar code data includes information not included in the graphical bar code data, but is relevant to the context of the graphical bar code data.

16. A network according to claim 1 wherein information related to the graphical bar code data includes at least some of the address of a client element, address of a control element, identifying information about a graphical bar code, at least a portion of a video signal containing graphical bar code data, area of interest relating to a graphical bar code, time graphical bar code data were contained in a video signal, what channel included graphical bar code data, what television program included a graphical bar code, a graphical representation of a graphical bar code, and metadata relating to a graphical bar code.

17. A network according to claim 1 wherein the at least one control element instructs, via broadcast messages, at least some of the client elements as to which video signals and areas of interest should be monitored by the receiver.

18. A network according to claim 1 wherein the at least one control element directs, via addressed messages to client elements, at least some of the client elements as to which video signals and areas of interest should be monitored by the receiver.

19. A network according to claim 1 wherein at least some AOI's are generated based at least in part on actions by the subscriber.

20. A network according to claim 1 wherein at least some AOI's are supplied to the at least one control element via at least one third party supplier and based on inferences drawn by the at least one supplier about the subscriber's preferences.

21. A network according to claim 1 wherein the network makes available to the subscriber information about graphical bar codes, graphical bar code data for which are included in video signals not being monitored by the subscriber's receiver.

22. A receiver for inclusion in a network, the network for processing and managing information related to graphical bar code data that generates graphical bar codes in video images, wherein the graphical bar codes are QR codes or one dimensional bar codes, and wherein the graphical bar codes can be acquired and decoded optically by a mobile device from a monitor that displays the graphical bar codes in the video images, the receiver coupled to a subscriber monitor that displays video images to a subscriber, the receiver receiving input from the subscriber as to at least one area of interest as to which the subscriber desires to obtain information, the receiver including:
one or more graphical bar code data locators, wherein each graphical bar code data locater is coupled to a video source and parses video signals from the video source to locate the graphical bar code data in the video signals;
one or more graphical bar code data decoders, each graphical bar code data decoder coupled to a graphical bar code data locater to decode the graphical bar code data;
wherein the locating and decoding of the graphical bar code data is accomplished without optically acquiring or decoding the graphical bar codes in video images generated by the graphical bar code data;
one or more graphical bar code data processors, each graphical bar code data processor coupled to a graphical bar code data locater; and
at least one client element coupled to at least one of the graphical bar code data processors, wherein the at least one client element:
connects via an external network to at least one control element to receive instructions from the at least one control element as to particular video signals and areas of interest that should be monitored by the receiver that includes the client element;
instructs one or more of the graphical bar code data processors to automatically monitor the particular video signals and areas of interest as to which the client element has received instructions from the control element, in order to locate and decode the graphical bar code data in the video signals; and
reports via an external network at least some information relating to the located and decoded graphical bar code data to the at least one control element.

23. A receiver according to claim 22 wherein the receiver is a set top box and the video signals are television signals.

24. A receiver according to claim 22 wherein the receiver is a set top box and the graphical bar code data are data that generate QR codes or bar codes that include a plurality of rectangles or squares.

25. A receiver according to claim 22 wherein the receiver is a set top box and at least one client element is implemented in software.

26. A receiver according to claim 22 that is a set top box that monitors at least some video signals regardless of whether a monitor connected to the receiver is in an on or off state.

27. A receiver according to claim 22 that connects to one or more devices for parsing multiple signals.

28. A receiver according to claim 22 wherein third parties have access to the at least one control element in order to input information.

29. A receiver according to claim 22 wherein at least some information related to graphical bar code data includes information not included in graphical bar code data, but relevant to the context of the graphical bar code data.

30. A receiver according to claim 22 wherein information related to detected graphical bar code data includes at least some of the address of the client element, address of a control element, identifying information about a graphical bar code, at least a portion of a video signal containing graphical bar code data, area of interest relating to a graphical bar code, time graphical bar code data were contained in a video signal, what channel included graphical bar code data, what television program included a graphical bar code, a graphical representation of a graphical bar code, and metadata relating to a graphical bar code.

31. A receiver according to claim 22 wherein the at least one client element learns information about how to locate graphical bar code data based on at least one previous location of graphical bar code data.

32. A receiver according to claim 22 wherein the at least one client element learns and reports to the at least one control element information about the subscriber's area of interest based on the subscriber's viewing of information relating to graphical bar codes.

33. A method for processing and managing information related to graphical bar codes in video images, wherein the graphical bar codes are QR codes or one dimensional bar codes, and wherein the graphical bar codes can be acquired and decoded optically by a mobile device from a monitor that displays the graphical bar codes in the video images, the method including the steps of:
 providing a receiver connected to at least one control element, the receiver coupled to a subscriber monitor that displays video images to a subscriber, the receiver receiving input from the subscriber as to at least one area of interest as to which the subscriber desires to obtain information, the receiver including:
 one or more graphical bar code data locators, wherein each graphical bar code data locater is coupled to a video source and parses video signals from the video source to locate the graphical bar code data in the video signals;
 one or more graphical bar code data decoders, each graphical bar code data decoder coupled to a graphical bar code data locater to decode the graphical bar code data;
 wherein the locating and decoding of the graphical bar code data is accomplished without optically acquiring or decoding the graphical bar codes in video images generated by the graphical bar code data;
 one or more graphical bar code data processors, each graphical bar code data processor coupled to a graphical bar code data locater; and
 at least one client element coupled to at least one of the graphical bar code data processors, wherein the at least one client element:
 connects via an external network to at least one control element to receive instructions from the at least one control element as to particular video signals and areas of interest that should be monitored by the receiver that includes the client element;
 instructs one or more of the graphical bar code data processors to automatically monitor the particular video signals and areas of interest as to which the client element has received instructions from the control element, in order to locate and decode the graphical bar code data in the video signals; and
 reports via an external network at least some information relating to the located and decoded graphical bar code data to the at least one control element;
 receiving, by the at least one client element and via an external network, instructions from the at least one control element as to particular video signals and areas of interest that should be monitored by the receiver;
 instructing, by the at least one client element, one or more of the graphical bar code data processors to automatically monitor the particular video signals and areas of interest as to which the at least one client element has received instructions from the at least one control element, in order to detect and decode graphical bar code data in the video signals; and
 reporting, by the at least one client element and via an external network, least some information relating to detected graphical bar code data to the at least one control element.

34. A method according to claim 33 wherein the receiver is a set top box and the video signals are television signals.

35. A method according to claim 33 wherein the receiver is a set top box and the graphical bar code data are data that generate QR codes or bar codes that include a plurality of rectangles or squares.

36. A method according to claim 33 wherein the receiver is a set top box and one or more client elements are implemented in software.

37. A method according to claim 33 further comprising monitoring at least some video signals regardless of whether a monitor connected to the receiver is in an on or off state.

38. A method according to claim 33 wherein the receiver is connected to one or more devices for parsing multiple signals.

39. A method according to claim 33 wherein at least one control element gives third parties access to the control element in order to input information.

40. A method according to claim 33 wherein at least some information relating to graphical bar code data includes information not included in graphical bar code data, but relevant to the context of the graphical bar code data.

41. A method according to claim 33 wherein information related to detected graphical bar code data includes at least some of the address of the client element, address of a control element, identifying information about a graphical bar code, at least a portion of a video signal containing graphical bar code data, area of interest relating to a graphical bar code, time graphical bar code data were contained in a video signal, what channel included graphical barcode data, what television program included a graphical bar code, a graphical representation of a graphical bar code, and metadata relating to a graphical bar code.

* * * * *